US007768678B2

(12) United States Patent
Nacman et al.

(10) Patent No.: US 7,768,678 B2
(45) Date of Patent: *Aug. 3, 2010

(54) SYSTEMS, METHODS AND DEVICES FOR ROTATING IMAGES

(75) Inventors: Aron Nacman, Rochester, NY (US); William David Notovitz, Webster, NY (US); Theresa Michelle Marconi, Penfield, NY (US); Brian Richard Caffee, Farmington, NY (US); Anthony Paul Lanza, Webster, NY (US); Timothy M. Hunter, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/433,529

(22) Filed: May 15, 2006

(65) Prior Publication Data

US 2007/0263234 A1    Nov. 15, 2007

(51) Int. Cl.
*H04N 1/04* (2006.01)

(52) U.S. Cl. .................. 358/488; 358/474; 358/539; 358/1.2; 358/426.05; 382/232; 382/297; 345/649; 345/552; 348/272

(58) Field of Classification Search .................. 358/1.2, 358/1.16, 1.17, 404, 452, 539, 474, 426.05; 345/126, 297, 201, 649, 158, 522, 582; 382/232, 382/297, 162, 166, 296; 348/272, 208.1, 348/222.1
See application file for complete search history.

(56) References Cited

U.S. PATENT DOCUMENTS

| 4,916,746 | A | * | 4/1990 | Yeschick | 382/297 |
|---|---|---|---|---|---|
| 4,947,344 | A | * | 8/1990 | Hayashi et al. | 345/658 |
| 5,034,733 | A | * | 7/1991 | Okazawa et al. | 382/297 |
| 5,111,192 | A | * | 5/1992 | Kadakia | 345/658 |
| 5,384,645 | A | | 1/1995 | Hasegawa et al. | |
| 5,426,733 | A | * | 6/1995 | Masui | 345/574 |
| 5,483,354 | A | * | 1/1996 | Kessels et al. | 358/444 |
| 5,598,181 | A | * | 1/1997 | Kermisch | 345/658 |
| 5,613,018 | A | | 3/1997 | Eldridge | |
| 5,751,865 | A | * | 5/1998 | Micco et al. | 382/296 |
| 6,023,556 | A | * | 2/2000 | Ledgard et al. | 358/1.2 |
| 6,307,966 | B1 | * | 10/2001 | Chapin | 382/232 |
| 7,027,190 | B2 | * | 4/2006 | Namizuka et al. | 358/3.1 |
| 7,059,733 | B2 | * | 6/2006 | Hoshino et al. | 353/122 |
| 7,573,490 | B1 | * | 8/2009 | de Waal | 345/649 |
| 7,629,987 | B1 | * | 12/2009 | De Waal | 345/649 |
| 2001/0043758 | A1 | * | 11/2001 | Yamaguchi et al. | 382/297 |
| 2003/0086120 | A1 | * | 5/2003 | Murata | 358/1.16 |

(Continued)

*Primary Examiner*—Negussie Worku
(74) *Attorney, Agent, or Firm*—MH2 Technology Law Group LLP (57) ABSTRACT

An embodiment generally relates a device for rotating images. The device includes an image memory configured to store an image and a plurality of buffers. The plurality of buffers are configured to interface with the image memory to read data words of the image from the image memory and to write rotated data words to the image memory. The device also includes a logic module configured to interface with the plurality of buffers and to micro-rotate and macro-rotate an image based on a selection of three orientations. The logic module is also configured to execute a read of data words from the image memory to a first buffer of the plurality of buffers, a rotation of a data word, and a write of rotated data words from a second buffer of the plurality of buffers to the image memory substantially simultaneously.

18 Claims, 4 Drawing Sheets

U.S. PATENT DOCUMENTS

2004/0179247 A1* 9/2004 Yamaguchi et al. ......... 358/474
2005/0073695 A1* 4/2005 Nacman et al. .............. 358/1.2
2009/0141746 A1* 6/2009 Fujikawa et al. .............. 372/10

* cited by examiner

SYSTEMS, METHODS AND DEVICES FOR ROTATING IMAGES

FIELD

This invention relates generally to images, more particularly, systems, methods and devices for rotating images.

DESCRIPTION OF THE RELATED ART

Image processing systems typically include an input device such as a scanner and a computer system that is equipped with document applications for storing and editing scanned electronic documents and an output device such as a printing system for rendering documents. The computer system is operated by a user to edit or to view scanned "softcopy" digital images on a monitor of the computer system. The user can subsequently generate "hardcopy" reproductions of the softcopy images by instructing the computer system to provide the processed electronic image to a selected printing device. Advances in printing technology together with advances in computer system technology are helping image processing systems become more pervasive in desk-top publishing and business applications. Inkjet, thermal-transfer, and xerographic color are examples of printing technologies that are making moderate resolution affordable.

Electronic images or "softcopy" images processed by desk-top publishing applications consist of two dimensional arrays of picture elements (pixels) or image signals. Historically small computer memories require the use of intermediate disk buffers to rotate an electronic image of reasonable size. However, with the availability of larger computer memories, desk-top publishing applications can store entire electronic images in real memory. Even with large real memory allocations, there is not always sufficient memory to store both an original image and a rotated image. In some systems for example, available computer memory is large enough to contain one electronic image but not large enough to contain both an original image and a rotated image. In such instances rotating an electronic image in place, that is, within its own buffer and without the use of significant intermediate memory or auxiliary memory is desirable. To rotate an electronic image in place requires that sequences of replacement operations are performed to an electronic image that is stored in an image buffer. Each replacement operation of a sequence must be performed so that each replacement operation does not erase pixels in the image buffer not already transferred.

Digital copiers are another type of image processing devices that scan an image, store a digital representation of the image in memory, and print the digital representation of the image. In order to print the digitized images at a rate similar to rates produced by conventional analog copiers that never store a digital representation of the image but use optical components such as mirrors and lenses to generate an image on a photoconductive drum or belt, a very large amount of data must be moved at a high rate of speed. The requirement to quickly move such a large amount of data has pushed the capabilities of current data processing and storage devices to their limits.

SUMMARY

An embodiment generally relates to a device for rotating images. The device includes an image memory configured to store an image and a plurality of buffers. The plurality of buffers are configured to interface with the image memory to read data words of the image from the image memory and to write rotated data words to the image memory. The device also includes a logic module configured to interface with the plurality of buffers and to micro-rotate and macro-rotate an image based on a selection of three orientations. The logic module is also configured to execute a read of data words from the image memory to a first buffer of the plurality of buffers, a rotation of a data word, and a write of rotated data words from a second buffer of the plurality of buffers to the image memory substantially simultaneously.

Another embodiment pertains generally to a method for operating a device. The method includes receiving a digital image in an image memory and transferring data words of the digital image to a plurality of buffers. The method also includes rotating the data words to one of a 90 degree rotation, a 180 degree rotation, and a 270 degree rotation. The method also includes executing a read of data words from the image memory to a first buffer of the plurality of buffers, rotating a data word, and executing a write of rotated data words from a second buffer of the plurality of buffers to the image memory substantially simultaneously.

Yet another embodiment relates generally to a system for rotating images. The system includes a field programmable gate array or ASIC, configured to implement functions. The functions include an image memory configured to store an image and a plurality of buffers, where the buffers are configured to interface with the image memory to read data words of the image from the image memory and to write rotated data words to the image memory. The functions also include a logic module configured to interface with the plurality of buffers and to micro-rotate and macro-rotate an image based on a selection of three orientations. The logic module is also configured to execute a read of data words from the image memory to a first buffer of the plurality of buffers, a rotation of a data word, and a write of rotated data words from a second buffer of the plurality of buffers to the image memory substantially simultaneously.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of image processing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to systems and methods for optimizing a configurable digital image rotator. More particularly, a configurable digital image rotator may include an image memory, a set of ping-pong buffers, and a rotator logic module. The image memory may be configured to store the digital representation of an image. The image memory may be implemented with a form of non-persistent memory such as dynamic random access memory (DRAM), static RAM, DDR-RAM, or other similar types of memory. The image memory may also be configured to interface with the set of ping-pong buffers.

The ping-pong buffers may include a pair of write buffers and a pair of read buffers. The buffers may be implemented using DRAM, SRAM, internal ASIC SRAM, internal FPGA SRAM, or other high-speed memory. The configurable digital image rotator may be configured for optimal performance with respect to parallel read/write accesses with the pair of read and write buffers. More particularly, for writes to the rotator logic module, a set of data may be written from the image memory to one of the read buffers of the ping-pong buffers while another access may occur from the second of the read buffer of the ping-pong buffer to the rotator logic module. Similarly, a set of data may be transferred from the rotator logic module to one of the write buffers while another set of data is being transferred from the second write buffer of the ping-pong buffer to the image memory.

The ping-pong buffers may also be configured to interface with the rotator logic module. The rotator logic module may be configured to rotate the image. More particularly, the rotator logic module may take a data word of the image and micro-rotate it for a selected rotation of 90 degrees (90°), 180 degrees (180°), or 270 degrees (270°). Subsequently, the rotator logic module may macro-rotate the data word to the correct position in the rotated image in the write buffer.

In some embodiments, the rotator logic module may implement an optimal 180° rotation heuristic. More particularly, a 180° rotation does not typically require data of two dimensions, i.e., a matrix of data. Accordingly, the rotator logic module may read a string of data starting with the first pixel (i.e., the upper left hand corner of an image) into one of the read buffers of the ping-pong buffers. Since the data is one dimensional (i.e., linear), large amounts of continuous (sequential addresses) data may be transferred using direct memory access (DMA) techniques. The rotator logic module may then be configured to read the string of data from the read buffer in reverse order. The rotator logic module may micro-rotate a data word of the string of data and reorder bits within the word depending on the number of bits per pixel required. More specifically, a pixel can be N bits wide, which can define a gray value or a pulse width value or some other mechanism for creating a multi level pixel. Therefore, the bits that compose this pixel need to be grouped together and treated as a single element in the micro-rotation algorithm. The rotated line of the image is then written into one of the write buffers of the ping-pong buffers.

The above described digital image rotator may be optimized for either cost or performance depending on the intended application and projected cost. For example, if a lower cost digital image rotator is desired, the digital image rotator may be configured with smaller ping-pong buffers. The performance during the 90° and 270° rotation may slip because of the smaller buffer size that does not accommodate DMA transfers efficiently. However, the performance of the digital rotator may be improved by implementing the optimal 180° heuristic because the size of the DMA transfers may be the size of the ping-pong buffers.

Figure 1:
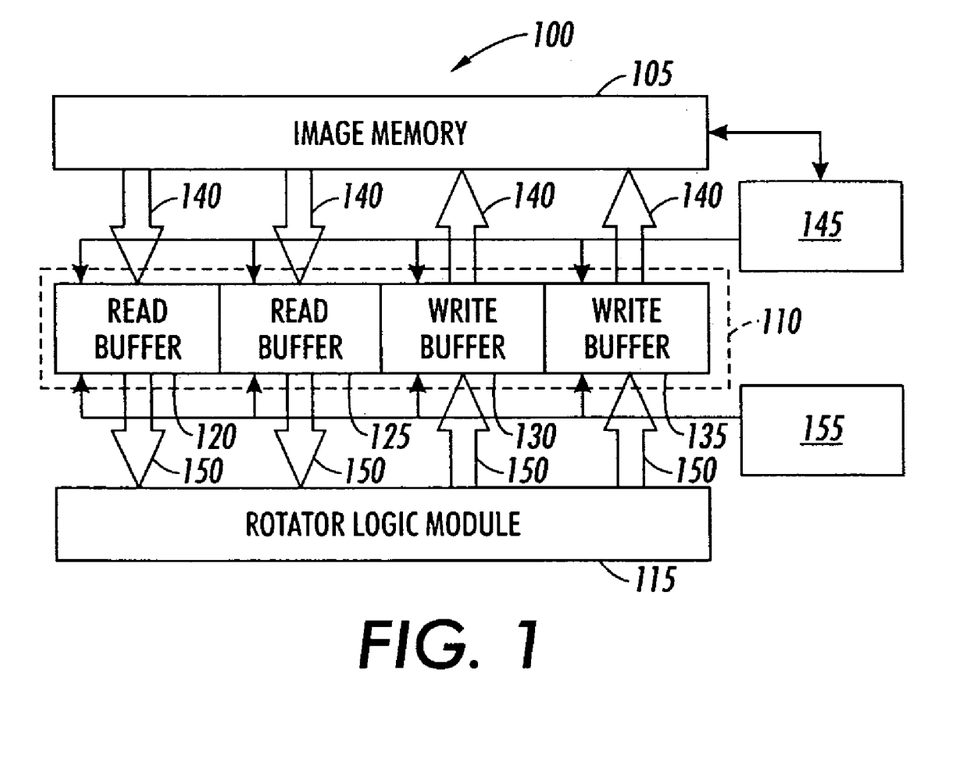
FIG. 1 illustrates an exemplary embodiment of a digital image rotator in accordance with an embodiment.

FIG. 1 illustrates an exemplary embodiment of a digital image rotator 100 in accordance with an embodiment of the invention. It should be readily apparent to those of ordinary skill in the art that the digital image rotator 100 depicted in FIG. 1 represents a generalized schematic illustration and that other components may be added or existing components may be removed or modified. Moreover, the components of the digital image rotator 100 may be implemented in hardware, software, or combinations thereof as known to those skilled in the art.

As shown in FIG. 1, the digital image rotator 100 includes an image memory 105, a set of ping-pong buffers 110, and a rotator logic module 115. The image memory 105 may be configured to store digital image file(s). The source of the digital image files may be from a scanner, a copier, disk storage device, a digital camera, and other similar devices (not shown). The digital image may be stored in the image memory 105 in a format of continuous sequence of addresses such that the upper left hand corner is the lowest address while the lower right hand corner is the highest memory address. The image memory 105 may also be configured to be rewritten to allow for a rotated version of the digital image. The orientation of the rotation may be selected from 90°, 180°, or 270° in some embodiments.

The image memory 105 may be implemented with a high speed memory or registers. The high speed memory may be a type of random access memory ("RAM") such as dynamic, static, extended data output, double data rate ("DDR"), or other similar device. In some embodiments the image memory 105 may be implemented as part of a field programmable array or an application specific integrated circuit ("ASIC").

The image memory 105 may be configured to interface with the set of ping-pong buffers 110, which may include at least two read buffers, read buffers 120 and 125. The set of ping-pong buffers 110 may also include at least two write buffers, 130 and 135. The buffers (120-135) may interface with the image memory 105 over an image memory-buffer bus 140. A direct memory access (DMA) controller 145 may be configured to interface with the buffers 120-135 and the image memory 105. The DMA controller 145 may increase the speed of data transfers between the image memory 105 and the set of ping-pong buffers 105 by providing a mechanism to transfer a large blocks (or bursts) of data between the two components.

The set of ping-pong buffers 110 may be implemented with high speed memory or registers. The high speed memory may be a type of random access memory ("RAM") such as dynamic, static, extended data output, double data rate ("DDR"), or other similar device. In some embodiments the set of ping-pong buffers 110 may be implemented as part of a field programmable array or an application specific integrated circuit ("ASIC").

The set of ping-pong buffers 110 may also be configured to interface with rotator logic module 115 over a buffer-logic bus 150. A DMA controller 155 may be configured to interface with the buffers 120-135 and the rotator logic module 115. As with DMA controller 145, DMA controller 155 may be configured to increase the performance of the digital image rotator 105 by transferring blocks of data (or bursts) between the ping-pong buffers 110 and the rotator logic module 115.

The rotator logic module 115 may be configured to provide the functionality to rotate the digital image stored in the image memory 105 to a desired orientation. In some embodiments the rotator logic module 115 may be implemented as part of a field programmable array or an application specific integrated circuit ("ASIC"). More particularly, rotator logic module 115 may be configured to micro-rotate a tile (or piece, section, area, etc.) of the image to the desired orientation, which is illustrated in FIG. 2.

Figure 2:
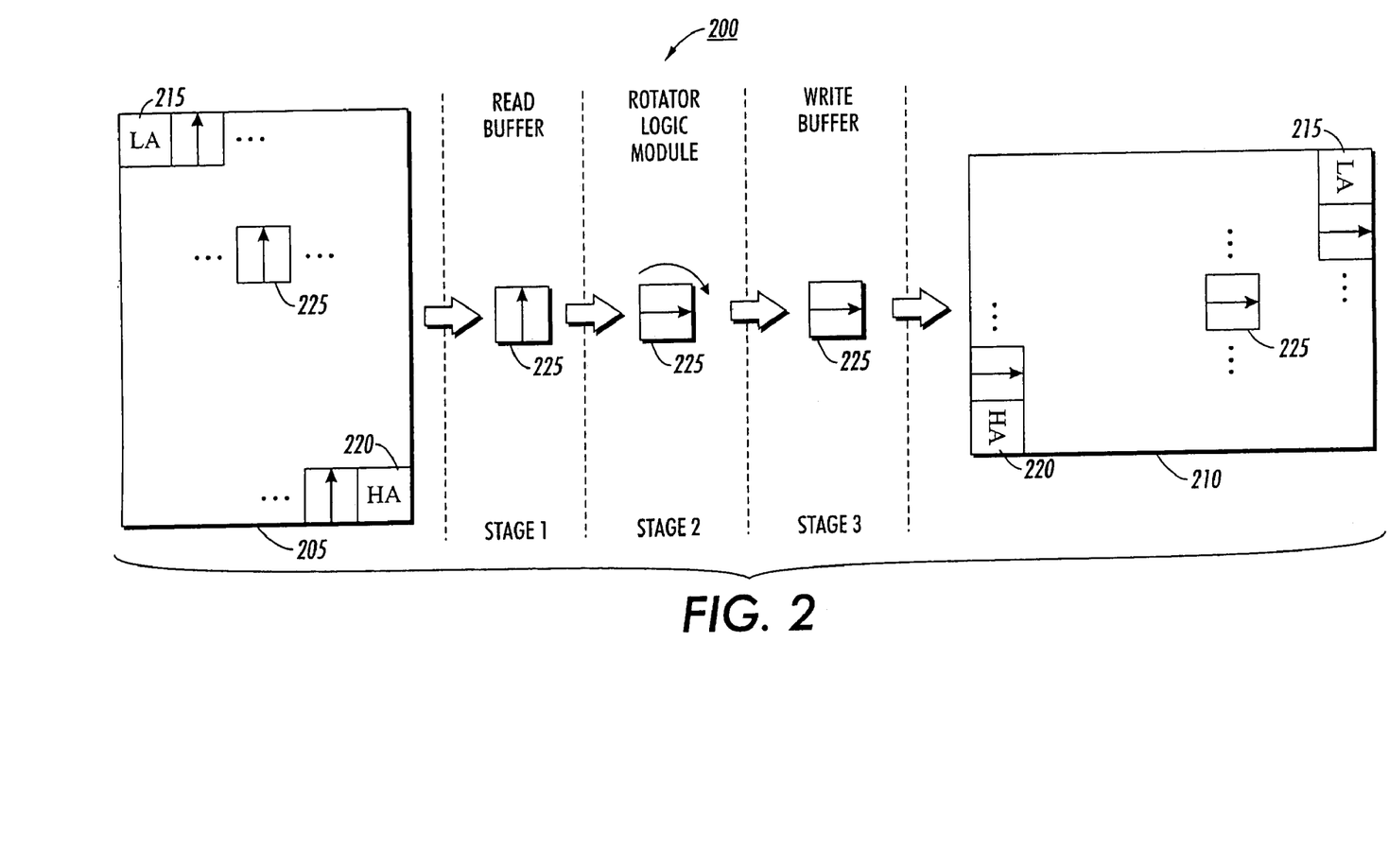
FIG. 2 illustrates an exemplary diagram of the rotation of an image in accordance with another embodiment.

As shown in FIG. 2, a digital image 205 may be selected to be rotated to a selected orientation (in FIG. 2, for example, 90°) to the rotated digital image 210. The digital image 205 may be sequenced into a set of continuous addresses. The lowest address of the sequence of address may be the upper left hand corner of the digital image 205, tile 215 (labeled as "LA" in FIG. 2) and the lower right hand corner of the digital image, tile 220 (labeled as "HA" in FIG. 2) having the highest address in the address sequence. The size of the tile may be dependent on the bandwidth of the digital image rotator 100.

For a selected tile, the tile, e.g. tile 225, may be transferred to one of the two read buffers 120, 125, in stage 1. From the read buffer (120 or 125), tile 225 may be transferred to the rotator logic module 115. In stage 2, the rotator logic module 115 may be configured to micro-rotate tile 225 to the desired orientation (in FIG. 2, 90°). Micro-rotation technique used in some of the embodiments may be based on re-ordering of the pixels in a small pixel matrix. For example, an 8×8 matrix of pixels (or any other square dimension) may be re-ordered to produce the desired rotation and then put into a second 8×8 matrix. The data comes from the read buffer into the read matrix and then is re-ordered into the write matrix and then written to the write buffer. The data from the read buffer is put into the read matrix in rows. If a 90° rotation is desired then the data is taken out of the read matrix so that the left most column becomes the top row of the write matrix where the top left input pixel becomes the top right output pixel. For 270° the left most column of the read matrix becomes the bottom row of the write matrix. For 180° the top row of the read matrix becomes the bottom row of the write matrix.

The rotation logic module 115 may also be configured to macro-rotate the micro-rotated tile 225. More specifically, the rotation logic module 115 recalculates the current address of tile 225 to a new address of tile 225 would be in the rotated image 210. More particularly, the image may be read in blocks starting with the top left corner in blocks that are equal to the size of the read buffer. This block is then micro-rotated and the write buffer data is put back into memory in the correct location for the desired rotation. In the case of 90° the top left block of the un rotated image becomes the top right block of the rotated image. Since the image is really a continuous string of addresses in memory, the write DMA needs to calculate the starting address of each burst of data for the start of each line of the block. This calculation is a simple addition/subtraction based on the size of the original image, the desired rotation angle, and the position of the block in the original image. After the first block is rotated the next block to be rotated is to the immediate right of the first block. When all the block across the top of the image are rotated, the next line of blocks is immediately below the first block. For the purposes of efficiency, the input image needs to be sized so that an integer number of blocks are in the image.

In stage 3, the selected tile may be transferred to one of the write buffers (130 or 135) with the new address position for the rotated tile 225. Subsequently, the selected tile 225 may be transferred back to the image memory 105. It should be readily obvious to those skilled in the art that the other rotation orientations are well within the scope of these embodiments.

Returning to FIG. 1, in accordance with some embodiments, the digital image rotator 100 may optimized for efficiency through the use of the ping-pong buffers 110. More particularly, the ping-pong buffers 110 are used to such that when a tile of the digital image is being rotated, the next tile is being read into the ping-pong buffers 110 while the previous rotated tile is being written into one of the ping-pong buffers. Since there are two read buffers and two write buffers in the ping-pong buffers 110, three operations (a read from image memory, a rotation, and a write to image memory) may be occurring substantially simultaneously, thus, increasing efficiency.

In other embodiments, the digital image rotator 105 may be optimized for transferring data between the components of the digital image rotator 105. More specifically, the most efficient way to read and write to memory is with a larger DMA burst size. However, for DMA burst, there are lost cycles between the bursts such that the larger the burst size, the fewer the lost cycles there are per bits transferred. As an example, for a 90° rotation at 1 bit per pixel, if a tile of the image were 32 pixels by 32 words, this would require 32×1 word (32 bits) bursts to read from memory. As such, this would require four 32×32 bit buffers for the set of ping-pong buffers 110. After the rotation of 90°, a DMA burst size of 64×1 word bursts to write to memory because of the switching of the dimensions during the rotation. Accordingly, the most efficient digital image rotator 105 would have the largest buffers possible to accommodate the largest burst size possible. However, the cost of the larger buffer size may become prohibitive.

Accordingly, other embodiments of the digital image rotator 105 may be optimized for cost and performance. More particularly, in a digital image rotator 105 where cost needs to be reduced, an optimal 180° rotation heuristic may be implemented. Since 180° rotation does not require a two-dimensional array of data, it is possible to use a smaller buffer to achieve a larger burst size for the read and write DMA transactions. Instead of reading a two-dimensional tile of the image into the ping-pong buffers 110, a linear string of data from the image is read into the read buffers (120, 125) starting with the first pixel of the image. Since this linear string of data is continuous, this data can be read using a large burst size. The rotator logic module 115 may then read this string of data (a data word) from one of the read buffers (120, 125) in reverse order such that the data word has been rotated. The rotator logic module 115 may use micro-rotation algorithms to rotate each data word and group each pixel depending on the number of bits per pixel required, i.e., each pixel needs to be treated as a single element no matter how many bits wide. The rotated data word may then be written to one of the write buffers (130, 135) to be written back into the image memory 105 in the appropriate location.

Continuing with the previous example, if the ping-pong buffers 110 were selected to by 4×32×32 buffers, then for 90° and 270° rotations, the digital image rotator 100 is limited to single word burst which is the least efficient. However, for the 180° rotation, the same buffer size would allow a single 32 word burst because of the need to only read and write one dimensional data.

Figure 3:
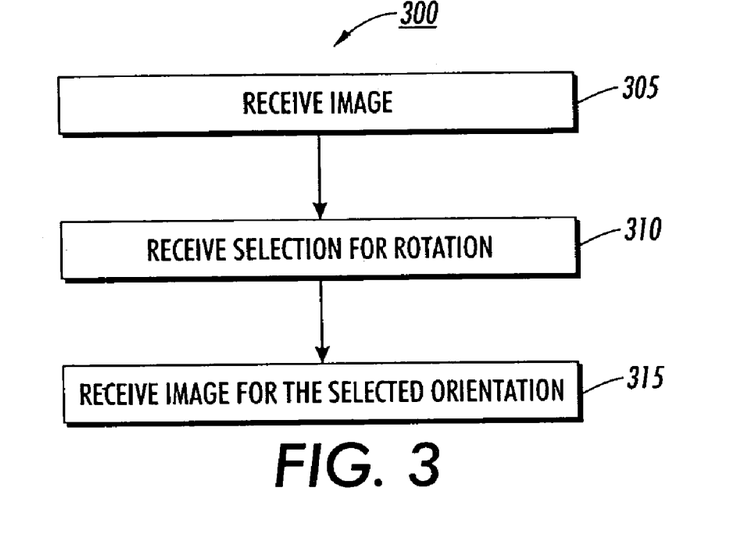
FIG. 3 illustrates an exemplary flow diagram implemented by the digital image rotator in accordance with another embodiment.

FIG. 3 illustrates an exemplary flow diagram 300 implemented by the digital image rotator in accordance with another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the digital image rotator 105 may be configured to receive a digital image, in step 305. The digital image may be sent from a copier, a scanner, a computer, a digital camera, or any other similar device that may generate a digital image.

In step 310, the digital image rotator 105 may be configured to receive a selection for a desired rotation. In some embodiments, the list of possible rotations may be 90°, 180° and 270°. The selection of the rotation may be implemented using a user interface from the sending device. In other embodiments, the desired rotation may be included in a metadata associated with the digital image.

Subsequently, in step 315, the digital image rotator 100 may be configured to rotate the image to the desired rotation. The rotated file may be forwarded to the source device that sent the digital image.

Figure 4:
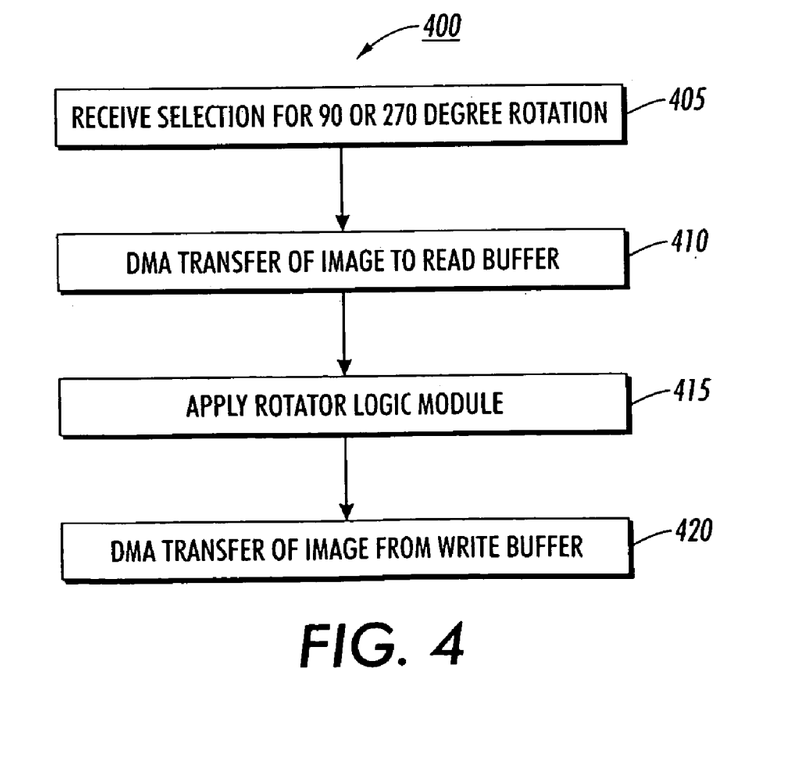
FIG. 4 illustrates another exemplary flow diagram implemented by the digital image rotator in accordance with yet another embodiment.

FIG. 4 illustrates another exemplary flow diagram 400 implemented by the digital image rotator 100 in accordance with yet another embodiment. It should be readily apparent to those of ordinary skill in the art that the flow diagram 400 depicted in FIG. 4 represents a generalized illustration and that other steps may be added or existing steps may be removed or modified.

Flow diagram 400 more fully depicts the processing involved with steps 310 and 315 depicted in FIG. 3 for the selection of a rotation of 90° or 270°. As shown in FIG. 4, the digital image rotator 100 may receive the selection of a rotation of 90° or 270°, in step 405. A 270° rotation may be considered a 90° rotation counterclockwise.

In step 410, the DMA controller 145 may be configured to transfer burst of data words to the one of the read buffers (120, 125). As discussed previously, the size of the burst may be dependent on the size of the ping-pong buffers 110.

In step 415, the rotator logic module 115 may be configured to read a data word from the selected read buffer (120, 125). As the rotator logic module 115 is reading from the selected read buffer (120, 125), the second read buffer (125, 120) is being filled with data words from the image memory 105. When the rotator logic module 115 finishes reading from the first read buffer (120, 125), it switches to the second read buffer (125, 120) to retrieve more data. The switching of read buffers continues until all the data has been processed.

Continuing with step 415, the rotator logic module 115 may apply a micro-rotation algorithm to rotate the desired data word to the selected orientation. The rotator logic module 115 may then apply macro-rotation algorithm to determine the correct address in the rotated digital image. The rotated data word is then written to one of the write buffers (130, 135).

In step 420, the data from the first write buffer (130, 135) storing rotated data words is transferred to the image memory 105 to the appropriate address location as determined by the macro-rotation algorithm in the rotator logic module 115. The transfer of rotated data words may be accomplished using DMA controller 145. While the rotated data is being transferred from the first write buffer (130, 135), the rotator logic module 105 may be substantially simultaneously writing the next data word to the second write buffer (135, 130). This process of switching write buffers (130, 135) may continue until the digital image is completely processed.

Figure 5:
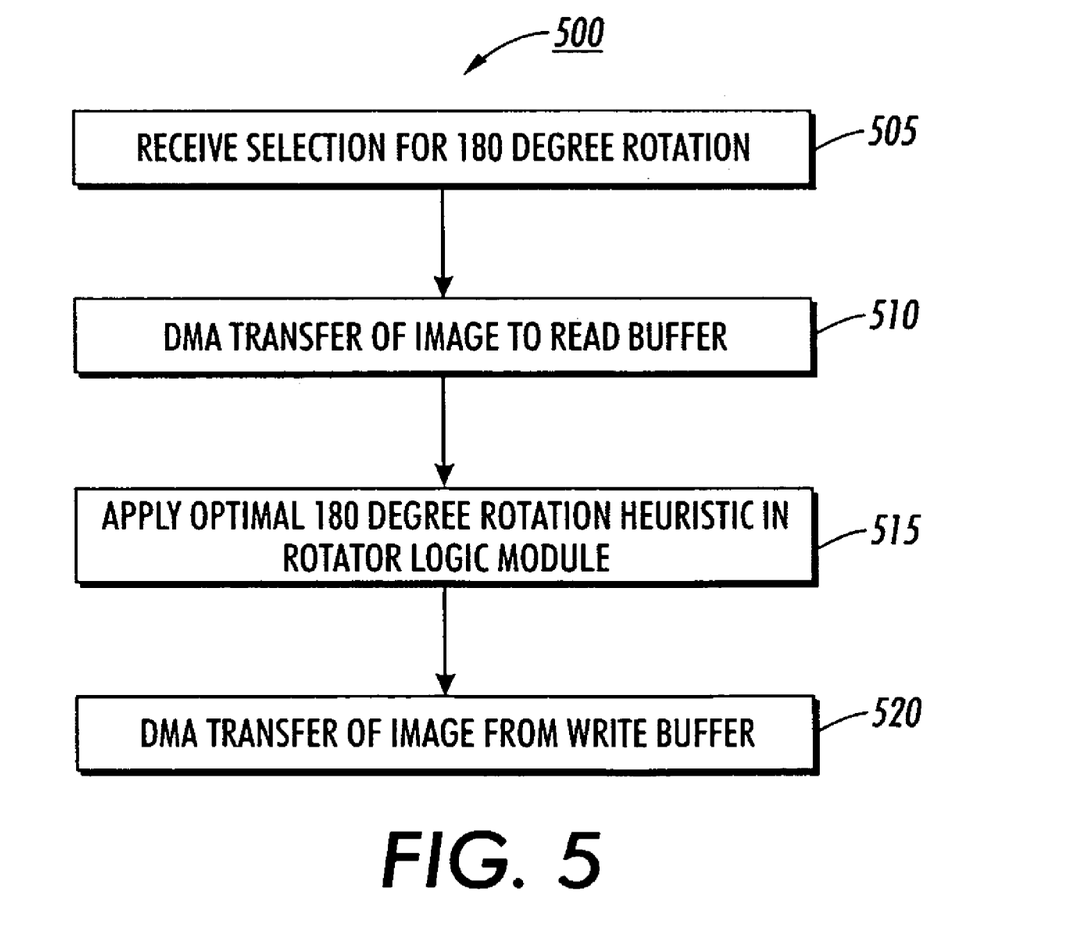
FIG. 5 illustrates yet another exemplary flow diagram implemented by the digital image rotator in accordance with yet another embodiment.

FIG. 5 illustrates yet another exemplary flow diagram 500 implemented by the digital image rotator in accordance with yet another embodiment. It should be readily apparent to those of ordinary skill in the art that the flow diagram 500 depicted in FIG. 5 represents a generalized illustration and that other steps may be added or existing steps may be removed or modified.

Flow diagram 500 more fully depicts the processing involved with steps 310 and 315 depicted in FIG. 3 for the selection of an orientation of 180° rotation. As shown in FIG. 5, the digital image rotator 100 may receive the selection of a rotation of 180°, in step 505. As previously described, the selected rotation may be included with the digital image file or may be indicated through a user interface.

In step 510, the DMA controller 145 may be configured to transfer burst of data words to the one of the read buffers (120, 125). As discussed previously, the size of the burst may be dependent on the size of the ping-pong buffers 110.

In step 515, the rotator logic module 115 may be configured to read a linear (one dimensional) data word in reverse order from the selected read buffer (120, 125). As the rotator logic module 115 is reading from the selected read buffer (120, 125), the second read buffer (125, 120) is being filled with one dimensional data words from the image memory 105. When the rotator logic module 115 finishes reading from the first read buffer (120, 125), it switches to the second read buffer (125, 120) to retrieve more data. The switching of read buffers continues until all the data has been processed.

Continuing with step 515, the rotator logic module 115 may apply a micro-rotation algorithm to rotate the desired data word 180° and reorder bits within the word depending on the number of bits per pixel required. The rotator logic module 115 may then write the rotated data word to a first write buffer (130, 135).

In step 520, the data from the first write buffer (130, 135) storing rotated data words is transferred to the image memory 105 using the DMA controller 145 in large bursts. While the rotated data is being transferred from the first write buffer (130, 135), the rotator logic module 105 may be substantially simultaneously writing the next rotated data word to the second write buffer (135, 130). This process of switching write buffers (130, 135) may continue until the digital image is completely processed.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A device for rotating images, the device comprising:
an image memory configured to store an image;
at least two read buffers configured to read data words of the image from the image memory; and
a processor configured to read the data words from the at least two read buffers, rotate pixels associated with the data words based on a received orientation selection, determine a new address in the image memory for the rotated data words, and write the rotated data words to at least two write buffers, wherein the at least two write buffers are configured to transfer the rotated data words to the image memory at the new address.

2. The device of claim 1, wherein the processor is configured to implement a direct memory access (DMA) write transfer and a DMA read transfer.

3. The device of claim 2, wherein the processor is further configured to read the data words from the at least two read buffers when the received orientation selection is 180 degrees.

4. The device of claim 3, wherein the processor is further configured to reorder the rotated pixels associated with the data words.

5. The device of claim 4, wherein the processor is further configured to write the rotated data words to the at least two write buffers using a DMA write transfer.

6. The device of claim 2, wherein a size of the at least two read buffers and the at least two write buffers is selected based on a burst size of a DMA transfer.

7. The device of claim 1, wherein a size of the at least two read buffers and the at least two write buffers is selected based on cost and performance of the device.

8. The device of claim 1, wherein the received orientation selection comprises one of a 90 degree rotation and a 270 degree rotation.

9. A method for operating a device, the method comprising:
storing a digital image in an image memory;
transferring data words of the digital image to at least two read buffers;
rotating pixels associated with the data words according to one of a 90 degree rotation, a 180 degree rotation, and a 270 degree rotation;
determining a new address in the image memory for the rotated data words;
writing the rotated data words to at least two write buffers; and
transferring the rotated data words to the image memory from the at least two write buffers for storage at the new address.

10. The method of claim 9, wherein the transferring of data words is implemented by direct memory access (DMA) transactions.

11. The method of claim 10, further comprising selecting a size of the at least two read buffers and the at least two write buffers based on an optimal burst size for a rotation of one of 90 degrees and 270 degrees.

12. The method of claim 10 further comprising selecting a size of the at least two read buffers and the at least two write buffers based on an optimal burst size for a rotation of 180 degrees.

13. A computer readable storage medium storing instructions to implement the method of claim 9.

14. A system for rotating images, the system comprising:
a processor coupled to memory and configured to implement functions comprising of:
an image memory configured to store an image;
at least two read buffers configured to read data words of the image from the image memory; and
a processor configured to read the data words from the at least two read buffers, rotate pixels associated with the data words based on a received orientation selection, determine a new address in the image memory for the rotated data words, and write the rotated data words to at least two write buffers, wherein the at least two write buffer is buffers are configured to transfer the rotated data words to the image memory at the new address.

15. The system of claim 14, wherein the processor is further configured to implement a direct memory access (DMA) write transaction and a DMA read transaction.

16. The system of claim 15, wherein a size of the at least two read buffers and the at least two write buffers is selected based on a burst size of a DMA transfer.

17. The system of claim 15, wherein the received orientation selection comprises a rotation of one of 90 degrees, 270 degrees, and 180 degrees.

18. The system of claim 14, wherein a size of the at least two read buffers and the at least two write buffers is selected based on cost and performance of the device.

* * * * *